Aug. 19, 1958 R. E. POULTON 2,848,558
PIEZO-ELECTRIC PICK-UPS
Filed July 27, 1954

INVENTOR
Roy Ernest Poulton
by [signature]
his atty

United States Patent Office 2,848,558
Patented Aug. 19, 1958

2,848,558

PIEZO-ELECTRIC PICK-UPS

Roy Ernest Poulton, Swindon, England, assignor to The Garrard Engineering and Manufacturing Company Limited, Swindon, England Application July 27, 1954, Serial No. 446,100

Claims priority, application Great Britain July 29, 1953

5 Claims. (Cl. 179—100.41)

Figures 1, 2:
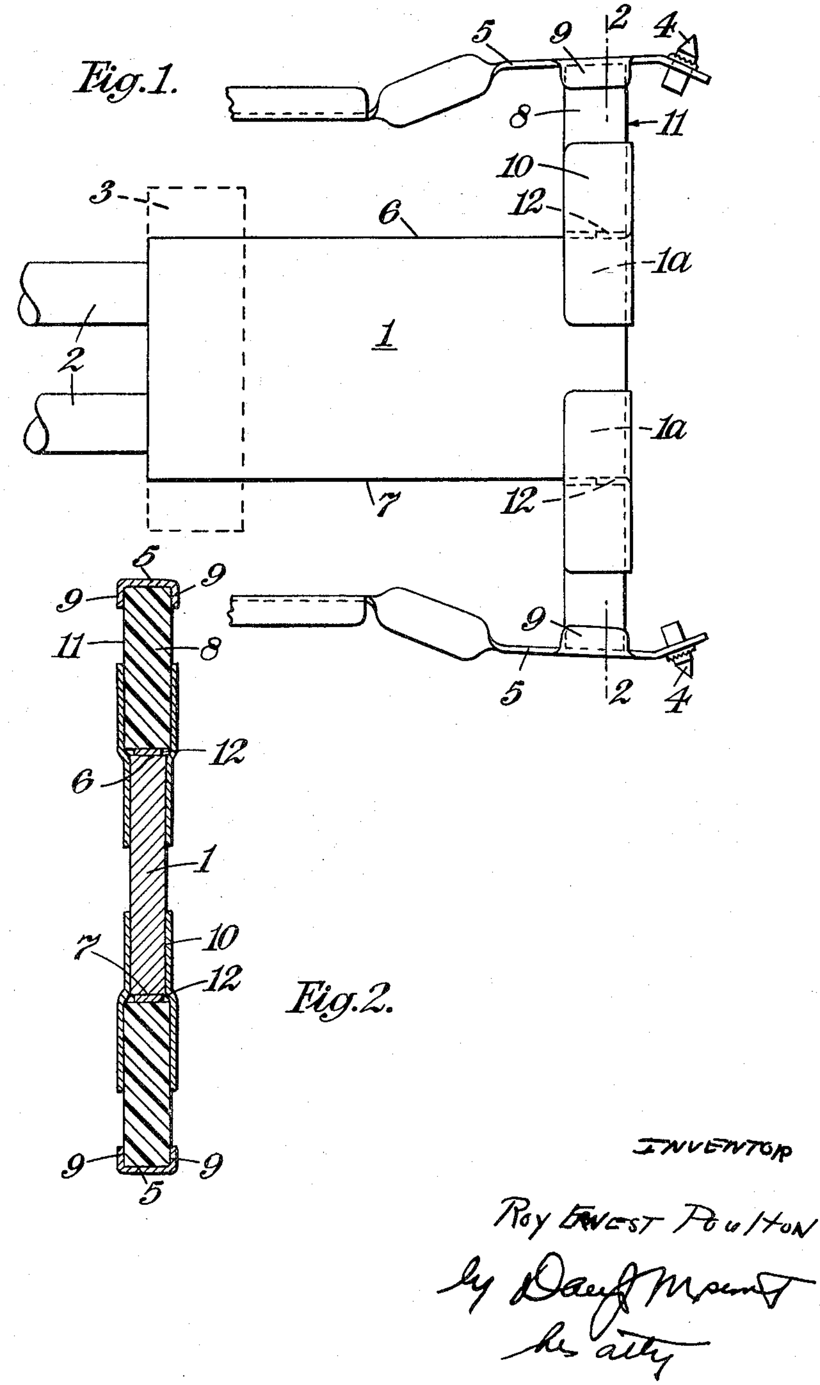

This invention relates to crystal or piezo-electric pick-ups for radio phonograph and the like and has for its object an improved arrangement for coupling the stylus to the piezo-electric element.

In sound reproducing apparatus involving the interaction of a stylus and a groove, it is necessary to provide slight damping of the stylus vibration which is transmitted to the next element in the reproducing system, in this instance the piezo-electric element. This damping is achieved by the use of various resiliently flexible materials, more particularly specially developed materials of a known character from the class commonly termed "plastics."

In connection with piezo-electric pick-ups, the element of which is in the form of a thin lamina, it has been previously proposed to couple the stylus to the element by means of a coupling member, made of the aforesaid material, of generally bar-like form having a longitudinal slot into which the crystal fits securely so that the coupling member extends transversely across the end of the element lying in the same planar direction, the stylus being connected to the free end of the coupling. With this arrangement vibration of the stylus is communicated to the element through the flexible coupling along its projecting portion and through the portion surrounding the end of the element. The flexible material generally used tends to soften on increase of the ambient temperature so that it becomes more pliable and transmits less of the stylus vibration to the element, thereby reducing its output. At the same time, however, the piezo-electric element increases its output as the ambient temperature rises so that there is some degree of compensation for the loss of output due to the increasing pliability of the flexible coupling. It has been found that unless the maximum pliability liable to be attained by the coupling is controlled, the loss of output due to such pliability outweighs the gain in output derived from the element itself to an extent that the resultant output of the pick-up is undesirably reduced.

It is an object of the present invention to provide a resiliently flexible coupling between the stylus and the piezo-electric element of a pick-up which avoids the disadvantage described above. The invention consists in a piezo-electric pick-up for radio phonographs and the like, wherein the stylus is connected to the piezo-electric element lamina by means of a coupling comprising an intervening member or bar of resiliently flexible material rigidly coupled at or near one end to the adjacent corner of the lamina of the element and at the other end engaging the stylus bearing member or stylus arm. The effective pliable length of the coupling may be reduced by the provision of relatively rigid "splint" means along the length of the coupling to reduce its freely flexible length.

According to a preferred form of the invention as set out in the two preceding paragraphs the flexible coupling is connected to the element by means of a metal clip crimped on to the piezo-electric element and extending therefrom to provide a socket in which the end of the coupling can be secured.

According to a further feature of the invention, oppositely extending couplings may be connected to the two adjacent corners at the end of the piezo-electric element to provide a double stylus (reversible) pick-up head in known manner, the stylus couplings being identical as to construction.

In the accompanying drawings:

Figure 1 is a side elevation of a piezo-electric element and stylus coupling, according to the present invention, for a reversible pick-up head, and Figure 2 is a section on the line 2—2 of Figure 1.

In carrying the invention into effect according to one mode by way of example, the piezo-electric element comprises a rectangular lamina 1 set up with its plane to be substantially vertical when in operation. From the rear end of the element 1 electric leads 2 extend in known manner. The rear end of the element is also clamped, as indicated by member 3 in broken lines, to provide an anchorage against which the element can be twisted by the stylus vibration in known manner. At the front of the element a pair of styli 4 are resiliently coupled as described hereinafter, one to each adjacent end corner *1a* of the element 1. Each stylus 4 is carried on a light stylus arm 5 extending generally in spaced parallelism with the upper and lower edges 6 and 7 of the element and anchored (not shown) rearwardly of the element to the structure of the pick-up unit or cartridge.

The coupling between the stylus arm 5 and the element 1 in each case comprises a short bar 8 of resiliently flexible plastic material formed of plasticized polyvinyl chloride, the pliability of which increases with temperature rise engaging the stylus arm 5 by means of channel-forming flanges 9 thereon and to the element by means of a metal clip 10 of channel shape crimped to the adjacent corner *1a* of the element and extending over the end of the plastic coupling bar 8 so as to grip it.

In order to reduce the pliability of the coupling bar 8, as required, the metal clip 10 may extend along the bar towards the stylus arm to leave only a small proportion 11 of the length of the coupling bar 8 to be freely flexible.

A thin spacing member 12 is preferably located between the end of the coupling bar 8 and the face of the element edge 6 or 7 at the corner *1a*.

Although plastic material forming the coupling bar 8 has been specified as preferably plasticised polyvinyl chloride, which is known to the art and is commercially obtainable in the trade, it is within the province of this invention to substitute other materials, likewise well known in the trade and having flexibility, and the effective pliability of which upon temperature increase, as applied in the coupling bar is reduced by the "splinting" effect through utilization of the within invention of applicant.

By this arrangement increasing pliability of the plastic coupling when the ambient temperature rises does not become so great that the output increase of the piezo-electric element cannot adequately compensate for the loss of transmitted stylus vibration.

I claim:

1. In a pick-up unit, a piezo-electric element mounted in a vertical plane for operation, a stylus, an arm carrying said stylus, said arm having a channeled socket, a clip rigidly connected to said piezo-electric element at a corner thereof, said clip having a channeled socket, the side walls of the respective channeled sockets of the arm and clip extending in the vertical plane, and means for coupling the piezo-electric element to the stylus, comprising a coupling bar of resiliently flexible material, whose pliability increases with increasing ambient temperature extending in the vertical plane and having its opposing ends entered into the respective sockets and rigidly clamped by the channeled walls thereof, to reduce the effective pliable length of the coupling bar to that portion thereof between the extremities of the channeled wall of the sockets clamping the same.

2. A pick-up unit in accordance with claim 1 wherein the channeled walls defining the respective sockets of the arm and clip are of relatively rigid material and in surface contact with the juxtaposition faces of the bar whereby to impart rigidity to those portions of the bar entered into the sockets.

3. A pick-up unit in accordance with claim 1, wherein at least the channeled walls of the clip socket are of rigid material and in surface contact with the juxtaposed portion of the bar whereby to impart a rigidity to that portion of the bar entered between the channeled walls of said clip.

4. A pick-up unit in accordance with claim 1, wherein a relatively thin spacing member is disposed within the clip socket and between the juxtaposed ends of the piezo-electric element and the coupling bar and wherein the walls defining the respective sockets of the arm and clip are of relatively rigid material and provide a splint effect with respect to that portion of the coupling bar disposed within the socket.

5. A pick-up unit in accordance with claim 1, wherein the piezo-electric element has associated therewith a pair of styli, one connected with each of the opposing corners of said piezo-electric element, each stylus being mounted on an arm incorporating a channeled socket, each corner of the piezo-electric element having a clip provided with a channeled socket rigidly connected thereto, and a pair of coupling members between each stylus and said piezo-electric element, each said coupling member having its opposing ends entered into the respective sockets of the pair of arms and clips and clamped by the channeled walls thereof, the piezo-electric element, the channeled sockets of each of the pairs of arms and clips, and each of the coupling members, all extending in the same vertical plane.

References Cited in the file of this patent

UNITED STATES PATENTS

| | | |
|---|---|---|
| 1,977,433 | Dunning | Oct. 16, 1934 |
| 2,492,446 | Schumann | Dec. 27, 1949 |
| 2,567,105 | Dreibach | Sept. 4, 1951 |
| 2,570,578 | Martin | Oct. 9, 1951 |
| 2,668,196 | Bauer | Feb. 2, 1954 |
| 2,670,407 | Martin | Feb. 23, 1954 |
| 2,681,388 | Goldmark et al. | June 15, 1954 |